G. H. WILSON.
GOVERNOR.
APPLICATION FILED SEPT. 16, 1908.
935,442.  Patented Sept. 28, 1909.
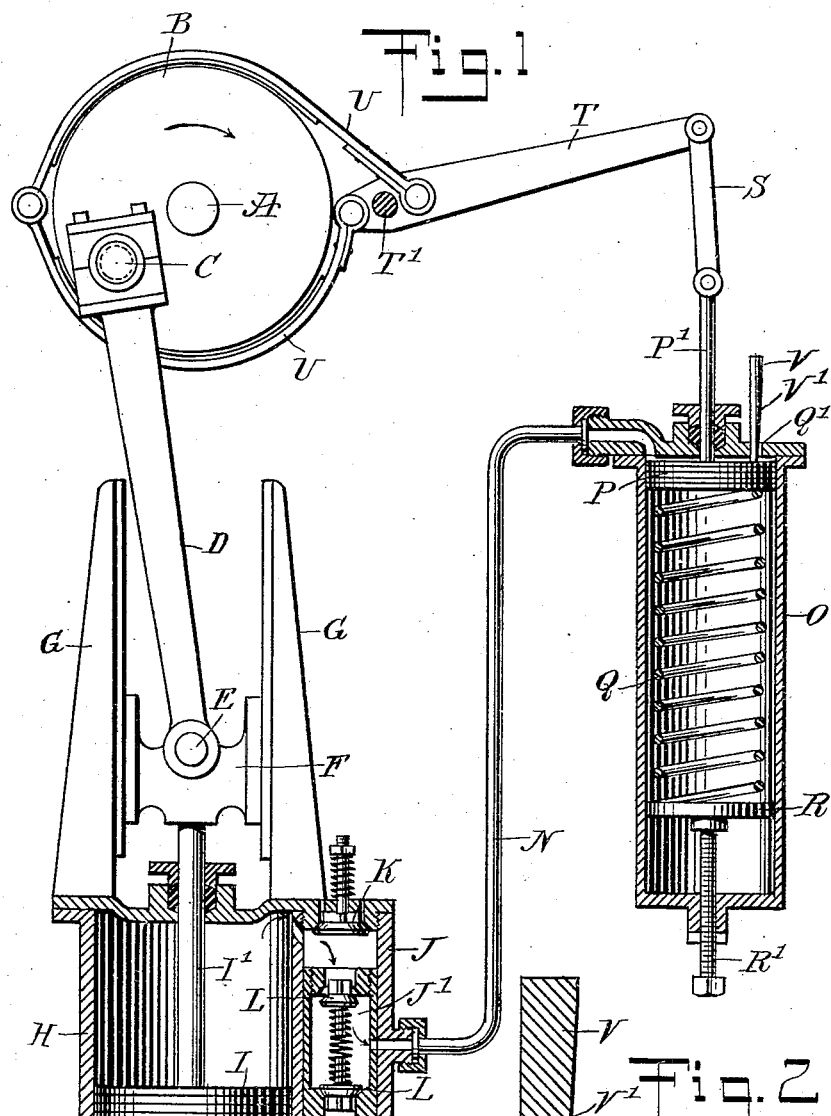
WITNESSES
INVENTOR
George H. Wilson
BY
ATTORNEYS

UNITED STATES PATENT OFFICE.

GEORGE HENERY WILSON, OF SPOKANE, WASHINGTON.

GOVERNOR.

935,442.

Specification of Letters Patent.  Patented Sept. 28, 1909.

Application filed September 16, 1908.  Serial No. 453,229.

*To all whom it may concern:*

Be it known that I, GEORGE H. WILSON, a citizen of the United States, and a resident of Spokane, in the county of Spokane and State of Washington, have invented a new and Improved Governor, of which the following is a full, clear, and exact description.

The object of the invention is to provide a new and improved governor, for automatically checking the speed of automatic fire escapes and other machinery requiring a steady, uniform motion.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in both views.

Figure 1 is a sectional side elevation of the improvement, and Fig. 2 is an enlarged sectional side elevation of the variable air vent.

On the shaft A of the machine to be governed by the improvement is secured a disk B, having a wrist pin C connected by a pitman D with the pin E in a cross head F, mounted to slide in suitable guideways G attached to the cylinder H of an air pump. In the cylinder H is mounted to reciprocate a piston I, having its piston rod I' connected with the cross head F, so that when the shaft A is running, reciprocating motion is given to the piston I in the cylinder H. The air pump is provided on one side of the cylinder H with a chest J, carrying inlet valves K and outlet valves L, discharging into a chamber J' formed in the chest J and connected by a pipe N with the upper end of a cylinder O, in which is mounted to reciprocate a piston P, pressed on at its under side by one end of a spring Q, resting with its lower end on a seat R held adjustably in the cylinder O by an adjusting screw R', to permit of regulating the compression of the spring Q. The piston rod P' of the piston P is connected by a link S with a brake lever T, fulcrumed at T' on a fixed support and pivotally connected on opposite sides of its fulcrum T' with the ends of a brake band U encircling the peripheral face of the disk B. Now when the air pump is running, air is pumped into the upper end of the cylinder O, and this air exerts a pressure against the piston P, so as to force the same downward against the tension of the spring Q. The downward movement of the piston P causes its piston rod P' to pull on the link S, which latter imparts a swinging motion to the brake lever T, to draw the brake band U with more or less force in frictional contact with the disk B, according to the reciprocating movement given to the piston P by the pressure of the air against one face of the piston and by the resistance given to the piston P by the spring Q. Air in the upper end of the cylinder O can escape through an air escape opening Q', through which extends a pin V, having one side V' flattened and beveled inwardly in a downward direction. Now when the piston P is in its uppermost position, as shown in Fig. 1, then the escape opening Q' is very little obstructed by the pin V, as the lower portion of the pin V now extends through the opening Q', and this lower pin portion has the widest part of the flattened side V' of the pin V. As long as the machine is running at a normal rate of speed, only an amount of air is pumped by the air pump into the cylinder O corresponding approximately to the amount that can escape through the opening Q', but when the speed of the shaft A increases, then the pump pumps a larger amount of air in a given time into the cylinder O, and consequently the pressure of the air exerted on the piston P forces the latter downward against the tension of the spring Q. Now the downward movement of the piston P applies the brake band U to the disk B and consequently the speed of the shaft A is checked.

It is understood that as soon as the piston P begins to move inward, the outlet area for the escape of the air is diminished by the pin V, and consequently a comparatively quick application of the brake band U is had on the disk B, in case the shaft A runs beyond a normal rate of speed.

From the foregoing it will be seen that by the use of the device the speed is automatically checked, and when the machine again runs at a normal rate of speed the piston P is returned to its normal position by the action of the spring Q.

Having thus described my invention, I claim as new and desire to secure by Letters Patent:

1. A governor, comprising a brake mechanism, an air pump, and a cylinder provided with an air vent and containing a resistance piston connected with and controlling the said brake mechanism, means whereby the movement of the piston to operate the brake will gradually close a vent, the said cylinder being connected with the said discharge of the said air pump to actuate the piston.

2. A governor, comprising a brake mechanism, an air pump, a cylinder containing a resistance piston connected with and controlling the said brake mechanism, the said cylinder being connected with the said discharge of the said air pump to actuate the piston, and a graduated air vent for the escape of the air from the said cylinder.

3. A governor, comprising a brake mechanism, an air pump, a cylinder containing a resistance piston connected with and controlling the said brake mechanism, the said cylinder being connected with the said discharge of the said air pump to actuate the piston, and a pin held on the said piston and extending through an air escape opening in the said cylinder, the said pin having a flattened and beveled face.

4. A governor, comprising a disk on the shaft of the machine to be governed, an air pump connected with and driven from the said disk, a cylinder having a spring-pressed piston and connected with the discharge of the said air pump, graduated means for controlling the escape of the air from the said cylinder, the said means being controlled by the said piston, a brake band for the said disk, and a brake lever connected with the said brake band and the said piston.

In testimony whereof I have signed my name to this specification in the presence of two subscribing witnesses.

GEORGE HENERY WILSON.

Witnesses:
W. L. SOLOMON,
F. S. BURBANK.